(12) United States Patent
Singh et al.

(10) Patent No.: US 10,527,005 B2
(45) Date of Patent: Jan. 7, 2020

(54) APPARATUS FOR REDUCING PRESSURE PULSATIONS IN A GASEOUS FUELLED INTERNAL COMBUSTION ENGINE

(71) Applicant: WESTPORT POWER INC., Vancouver (CA)

(72) Inventors: Ashish Singh, Vancouver (CA); Alain M. J. Touchette, Vancouver (CA); David K. Mumford, Vancouver (CA); Guowei Li, Vancouver (CA); Michael C. Wickstone, Richmond (CA); Christopher J. B. Dicken, Vancouver (CA)

(73) Assignee: WESTPORT POWER INC., Vancouver (CA)

( * ) Notice: Subject to any disclaimer, the term of this patent is extended or adjusted under 35 U.S.C. 154(b) by 61 days.

(21) Appl. No.: 15/534,977

(22) PCT Filed: Dec. 11, 2015

(86) PCT No.: PCT/CA2015/051315
§ 371 (c)(1),
(2) Date: Jun. 9, 2017

(87) PCT Pub. No.: WO2016/090497
PCT Pub. Date: Jun. 16, 2016

(65) Prior Publication Data
US 2017/0356391 A1      Dec. 14, 2017

(30) Foreign Application Priority Data

Dec. 11, 2014   (CA) .................................... 2874627

(51) Int. Cl.
*F02M 21/02*      (2006.01)
*F02M 43/04*      (2006.01)
(Continued)

(52) U.S. Cl.
CPC ..... *F02M 21/0239* (2013.01); *F02D 19/0689* (2013.01); *F02D 19/0694* (2013.01);
(Continued)

(58) Field of Classification Search
CPC .............. F02M 21/0239; F02M 43/04; F02M 2200/315; F02M 21/0263; F02D 19/10;
(Continued)

(56) References Cited

U.S. PATENT DOCUMENTS 5,752,486 A * 5/1998 Nakashima .......... F02M 47/027
123/447
5,832,906 A * 11/1998 Douville ................... F17C 5/06
123/527
(Continued)

FOREIGN PATENT DOCUMENTS

| CA | 2 875 512 A1 | 2/2015 |
|---|---|---|
| DE | 10 2006 003 639 A1 | 8/2007 |
| EP | 0 780 569 A1 | 6/1997 |

OTHER PUBLICATIONS

International Search Report and Written Opinion, dated Feb. 19, 2016, for International Application No. PCT/CA2015/051315, 9 pages.
Extended European Search Report, dated Apr. 20, 2018, for European Application No. 15867340.0-1007, 8 pages.

*Primary Examiner* — Jacob M Amick
*Assistant Examiner* — Charles Brauch
(74) *Attorney, Agent, or Firm* — Seed IP Law Group LLP

(57) ABSTRACT

An improved body defining a restricted fluid flow passage in a fuel supply system for delivering a gaseous fuel to an internal combustion engine. The body is formed for installation between and fluidly connecting a gaseous fuel supply conduit and a gaseous fuel flow passage that defines a predetermined volume between the restricted fluid flow passage and a nozzle chamber of a fuel injector from which (Continued)

the gaseous fuel is injected into the internal combustion engine. The restricted fluid flow passage has the smallest effective flow area between the gaseous fuel supply conduit and the nozzle chamber. The restricted fluid flow passage is located a predetermined distance from an injection valve seal within the fuel injector. The predetermined distance is calculated as a function of the speed of sound in the gaseous fuel and an opened time of the fuel injector.

25 Claims, 7 Drawing Sheets

(51) Int. Cl.
*F02D 19/06* (2006.01)
*F02D 19/10* (2006.01)
(52) U.S. Cl.
CPC ............. *F02D 19/10* (2013.01); *F02M 43/04* (2013.01); *F02M 21/0263* (2013.01); *F02M 2200/315* (2013.01); *Y02T 10/32* (2013.01); *Y02T 10/36* (2013.01)

(58) Field of Classification Search
CPC .. F02D 19/0694; F02D 19/0689; Y02T 10/32; Y02T 10/36
See application file for complete search history.

(56) References Cited

U.S. PATENT DOCUMENTS

| 5,868,122 | A | * | 2/1999 | Gram | ................. F02M 21/0224 |
| | | | | | 123/527 |
| 6,089,467 | A | | 7/2000 | Fochtman et al. | |
| 7,059,548 | B2 | | 6/2006 | Reiter et al. | |
| 7,124,959 | B2 | | 10/2006 | Baker et al. | |
| 7,516,734 | B2 | | 4/2009 | Tominaga et al. | |
| 7,617,991 | B2 | * | 11/2009 | Wells | ................... F02M 61/165 |
| | | | | | 239/5 |
| 9,022,303 | B2 | | 5/2015 | Mumford et al. | |
| 2013/0255646 | A1 | * | 10/2013 | Ulrey | ................. F02D 41/0027 |
| | | | | | 123/527 |
| 2014/0034020 | A1 | | 2/2014 | Baldwin et al. | |

* cited by examiner

APPARATUS FOR REDUCING PRESSURE PULSATIONS IN A GASEOUS FUELLED INTERNAL COMBUSTION ENGINE

TECHNICAL FIELD

The present disclosure relates to an apparatus which is part of the fuel supply system for a gaseous-fuelled internal combustion engine and comprises a body which defines a restricted fluid flow passage for reducing the pressure pulsations at the fuel injector nozzle.

BACKGROUND

Liquid fuels such as diesel and, more recently, gaseous fuels have been used to fuel vehicle engines for many years now. Such gaseous fuels include, among others, natural gas, propane, hydrogen, methane, butane, ethane or mixtures thereof. The engine fuel injection system generally comprises a plurality of fuel injectors fluidly connected to a fuel supply conduit. Generally, in the case of a direct injection system, each fuel injector is located in a bore formed in the cylinder head of the engine and the fuel supply conduit, commonly referred to as the fuel rail, can be either located in a bore formed in the cylinder head or can be an external pipe which is fluidly connected to each of the injectors through bores provided in the cylinder head. Each injector operates as a fuel valve which opens and closes to inject fuel into the combustion chamber of each engine cylinder and respectively, to stop fuel flow into the combustion chamber. Such opening and closing of the fuel injectors generates pressure pulsations at the injector fuel inlet which cannot be dampened during the time the injector is closed because of the short interval between the injection events. Such pressure pulsations can generate a fuel pressure increase or a pressure drop at the injector nozzle which affects the amount of fuel injected into the combustion chamber during an injection event. Such pressure pulsations can also be transmitted from one injector back to the fuel rail and through the rail to the next fuel injector of the engine. Furthermore, if the pressure in the fuel rail fluctuates the pressure pulsations in the rail can be transmitted to the inlet of the fuel injector and further to the injector nozzle.

In the past, the problem described above has been addressed by incorporating a bush in the fuel rail which supplies fuel to an injector of diesel engine, as described for example in U.S. Pat. No. 7,516,734, such bush providing an orifice which restricts fuel flow from the fuel rail to the injector, thereby dampening the pressure pulsations in the fuel passage which connects the fuel rail to the fuel injector. Several other similar solutions have been disclosed in the prior art to address the problem of pressure pulsations in conventional liquid fuels such as diesel fuel or gasoline supplied to an injector of an internal combustion engine. In gaseous fuels, the pressure pulsations caused by the opening and closing of the injectors behave differently than in liquid fuels, because of the physical composition of the gaseous fuel which tends to prolong the pressure oscillations.

In other variants, at least one dampening element is disposed in an opening of the fuel injector through which fuel flows from the fuel rail such as described in U.S. Pat. No. 7,059,548.

The design solutions presented in the prior art do not consider the problem of determining the location of the pulsation dampening orifice relative to the injector nozzle for controlling the dampening of the pressure pulsations between the fuel rail and the fuel injector and for controlling the fuel pressure within the nozzle chamber before fuel is injected into the combustion chamber. This problem becomes even more relevant for dual fuel engines which inject a gaseous fuel and a liquid fuel directly into the combustion chamber through a dual fuel injection valve which comprises a dual needle assembly having concentric needles for separately and independently injecting the liquid fuel and the gaseous fuel, as described for example in applicant's U.S. Pat. No. 7,124,959. In such fuel injectors a predetermined bias has to be maintained between the liquid fuel pressure and the gaseous fuel pressure within the body of the injector, with the liquid fuel pressure being higher than the gaseous fuel pressure, to prevent gaseous fuel leakage into the liquid fuel. Gaseous fuel, due to its physical state, can more easily leak past the sealing arrangements within the fuel injector and can leak into the liquid fuel or can compromise the hydraulic function of the valve actuators if it leaks from the gaseous fuel passage into the hydraulic fluid control chamber inside the fuel injector.

Accordingly there is a need for a solution for a better control of dampening the pressure pulsations at the fuel injector nozzle while controlling the pressure drop between the fuel rail and the fuel injector nozzle to prevent leakage and to control the fuel pressure at the injector nozzle before it is injected into the combustion chamber.

SUMMARY

An improved body defining a restricted fluid flow passage in a fuel supply system for delivering a gaseous fuel to an internal combustion engine. The body is formed for installation between and fluidly connecting a gaseous fuel supply conduit and a gaseous fuel flow passage that defines a predetermined volume between the restricted fluid flow passage and a nozzle chamber of a fuel injector from which the gaseous fuel is injected into the internal combustion engine. The restricted fluid flow passage has the smallest effective flow area between the gaseous fuel supply conduit and the nozzle chamber. The restricted fluid flow passage is located a predetermined distance from an injection valve seal within the fuel injector. The predetermined distance is calculated as a function of the speed of sound in the gaseous fuel and an opened time of the fuel injector.

The speed of sound can be determined as a function of a maximum gaseous fuel pressure employed by the fuel supply system and the opened time is the maximum opened time of the fuel injector employed for the internal combustion engine. In an exemplary embodiment the predetermined distance is at least equal to the distance defined by the multiplication product of the speed of sound in the gaseous fuel and the opened time of the fuel injector. In another exemplary embodiment, the predetermined distance is at least equal to half the distance defined by the multiplication product of the speed of sound in the gaseous fuel and the opened time of the fuel injector.

In an exemplary embodiment, the fluid flow area of the restricted fluid flow passage is selected as a function of the predetermined volume to maintain pressure pulsations within the gaseous fuel flow passage within a predetermined pressure range while maintaining gaseous fuel pressure within the nozzle chamber above a predetermined threshold that is needed to inject a commanded amount of gaseous fuel within a predetermined injection pulse width for each engine operating condition.

An improved fuel supply system for a gaseous fuelled internal combustion engine. There is a gaseous fuel supply conduit and a fuel injector for injecting gaseous fuel into the internal combustion engine. The fuel injector has a first body comprising an inlet, and a nozzle chamber fluidly connected to the inlet and from which the gaseous fuel is injected into the internal combustion engine. The fuel injector has a needle and a seat, an injection valve is formed when the needle abuts the seat. There is a second body formed for installation between and fluidly connecting the gaseous fuel supply conduit and a gaseous fuel flow passage of a predetermined volume through which the gaseous fuel supply conduit is connected to the nozzle chamber. The second body defines a restricted fluid flow passage for delivering the gaseous fuel to the nozzle chamber. The restricted fluid flow passage has the smallest effective area between the gaseous fuel supply conduit and the nozzle chamber. The restricted fluid flow passage is located a predetermined distance from an injection valve seal within the fuel injector. The predetermined distance is calculated as a function of the speed of sound in the gaseous fuel and an opened time of the fuel injector.

An improved method of limiting pressure pulsations within a fuel supply system of a gaseous fuelled internal combustion engine comprising a fuel injector. The fuel injector has an injection valve, and the injection valve has an injection valve seal. The method comprises locating a restricted fluid flow passage between a gaseous fuel supply conduit and the injection valve seal. The restricted fluid flow passage has the smallest effective area between the gaseous fuel supply conduit and the injection valve seal. The restricted fluid flow passage is located a predetermined distance from the injection valve seal. The predetermined distance is calculated as a function of the speed of sound in the gaseous fuel and an opened time of the fuel injector.

The method can further include determining the speed of sound as a function of a maximum gaseous fuel pressure of the fuel supply system; and determining the opened time as the maximum opened time of the fuel injector employed for the gaseous fueled internal combustion engine. In an exemplary embodiment, the method further includes actuating the fuel injector between a closed position and an open position thereby opening the injection valve whereby a pressure wave is generated that travels towards the restricted fluid flow passage as gaseous fuel flows through the injection valve; and actuating the fuel injector between the open position and the closed position such that the injection valve is closed when or before the pressure wave reaches the restricted fluid flow passage. In another exemplary embodiment, the method further includes actuating the fuel injector between a closed position and an open position thereby opening the injection valve whereby a pressure wave is generated that travels towards the restricted fluid flow passage as gaseous fuel flows out of the fuel injector; and actuating the fuel injector between the open position and the closed position such that the injection valve is closed before or when the pressure wave substantially returns to its origin after being reflected by the restricted fluid flow passage.

DETAILED DESCRIPTION

Figure 1:
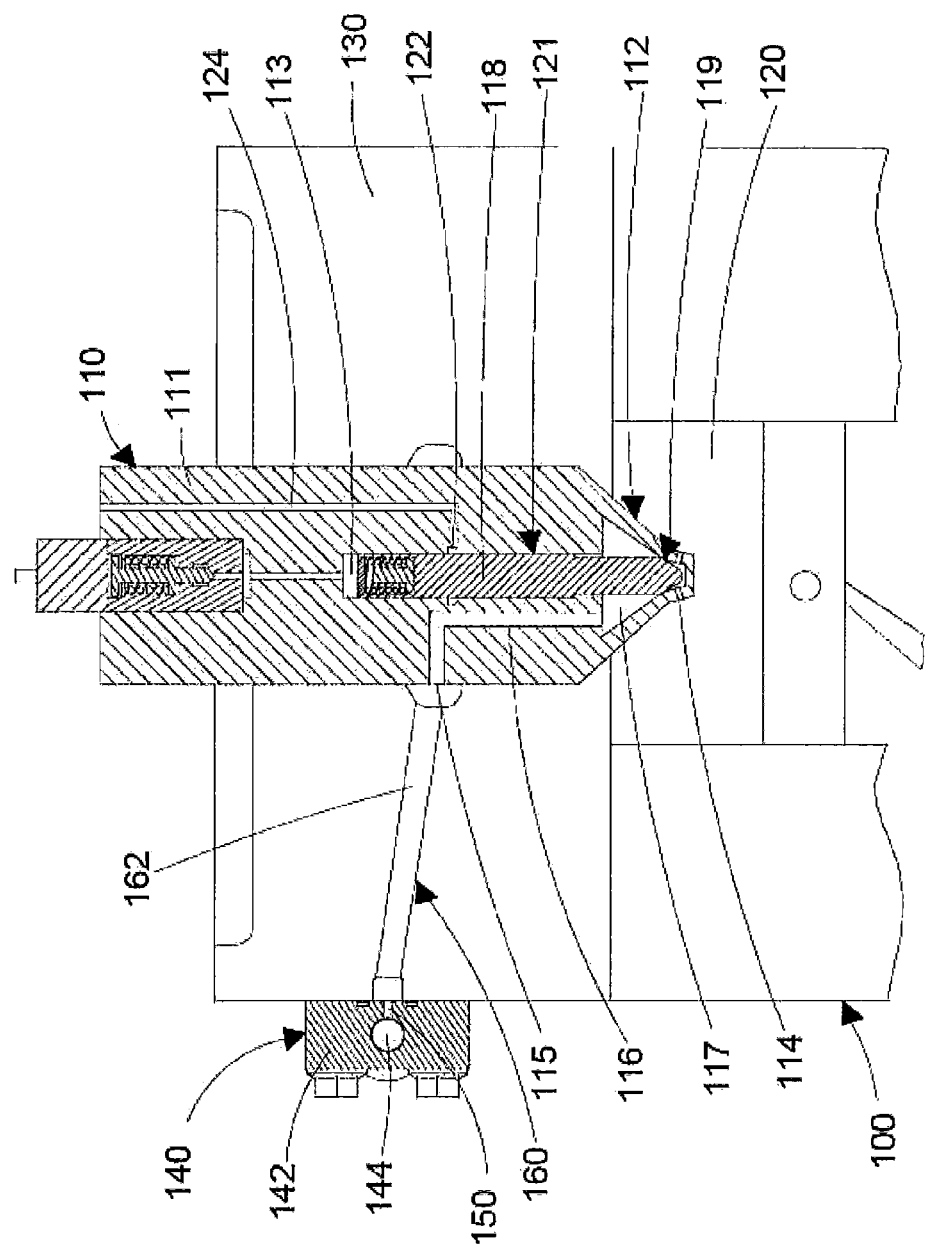
FIG. 1 is a schematic representation of the present fuel supply system for a gaseous fuelled internal combustion engine.

FIG. 1, schematically illustrates the present fuel supply system for a gaseous fuelled internal combustion engine having an external gaseous supply conduit 140, also known as a gaseous fuel rail. The fuel supply system comprises a fuel injector 110 for injecting gaseous fuel into the combustion chamber 120 of engine cylinder 100. Fuel injector 110 has a body 111 which comprises nozzle 112 provided with a plurality of injection holes 114 through which fuel is injected into combustion chamber 120, an inlet 115 which is fluidly connected to the gaseous fuel supply conduit and an internal fuel passage 116 for fluidly connecting fuel inlet 115 to nozzle chamber 117 within the fuel injector body. The fuel injector further comprises needle 118 which can be lifted from its seat 119 to open the fuel injector and allow fuel to be injected from nozzle chamber 117 through fuel injection holes 114 into combustion chamber 120. When the injector is closed, needle 118 is seated in its seat 119 forming an injection valve seal that stops the fuel injection. As illustrated in FIG. 1 needle 118 can be actuated by a hydraulic actuator, more specifically needle 118 moves within needle bore 121 inside body 111 of the fuel injector being actuated by the hydraulic fluid pressure in hydraulic control chamber 113 of the hydraulic actuator which is controlled by the engine controller. To avoid any gaseous fuel leakage from nozzle chamber 117 to hydraulic control chamber 113 fluid seals 122 are provided between the needle and the needle bore in the body of the injector. Sealing fluid is supplied to the seals through sealing fluid passage 124. Furthermore, to prevent any further leakage, needle 118 is match fit with needle bore 121 between hydraulic control chamber 113 and nozzle chamber 117.

In the embodiment illustrated in FIG. 1, the fuel injector is mounted in the cylinder head 130 and fuel is injected directly into combustion chamber 120. Gaseous fuel is supplied to fuel injector 110 from gaseous fuel supply conduit 140 which is mounted on the cylinder head 130 and which comprises a body 142 and a gaseous fuel supply passage 144 through which fuel flows. Fuel is supplied from the gaseous fuel supply passage 144 of the gaseous fuel supply conduit through restricted fluid flow passage 150 (that is, the dampening orifice) and gaseous fuel flow passage 160 to nozzle chamber 117. Gaseous fuel flow passage 160 comprises a first flow passage 162 within cylinder head 130 through which fuel is supplied from the gaseous fuel supply conduit 144 to injector inlet 115 and internal fuel passage 116 within the body of the injector through which fuel is supplied from injector inlet 115 to nozzle chamber 117. Gaseous fuel flow passage 160 fluidly connects restricted fluid flow passage 150 to nozzle chamber 117.

When gaseous fuel is supplied from gaseous fuel supply conduit 144 to nozzle chamber 117 the pressure pulsations from the gaseous fuel supply conduit can be transmitted to the fuel injector inlet and downstream to nozzle chamber 117. Similarly the pressure pulsations in nozzle chamber 117 caused by the opening and closing of the injector can be transmitted back to the gaseous fuel supply conduit amplifying the pulsations therein. Such pressure pulsations within the gaseous fuel flow passage and within the nozzle chamber can cause variations in the amount of fuel injected in the combustion chamber during an injection event, more specifically within a predetermined injection pulse width which is commanded by the engine controller according to the engine operating condition. Furthermore, such pressure pulsations can cause the pressure in nozzle chamber 117 to become higher than the pressure of the sealing fluid or of the hydraulic fluid in hydraulic control chamber 113. In such situations, gaseous fuel can leak through the match fit into the sealing fluid and/or into the hydraulic fluid which is not desirable. There is therefore a need to limit the magnitude of the pressure pulsations within nozzle chamber 117 within predetermined limits.

In the present disclosure, restricted fluid flow passage 150 and the volume of first fuel flow passage 162 between restricted fluid flow passage 150 and fuel injector inlet 115 are dimensioned to reduce the pressure pulsations within gaseous fuel flow passage 160 and implicitly within nozzle chamber 117. The volume of the first fuel flow passage 162 and implicitly the volume of the gaseous fuel flow passage 160 which comprises the first fuel flow passage 162 are calculated to reduce the pressure pulsations at the injector inlet and within the nozzle chamber and the fluid flow area of the restricted fluid flow passage 150 is selected as a function of the predetermined (calculated) volume of the first fuel flow passage 162 and implicitly as a function of the volume of entire gaseous fuel flow passage 160 to maintain the pressure pulsations with gaseous fuel flow passage 160 and within nozzle chamber 117 within a predetermined pressure range while maintaining the gaseous fuel pressure within the nozzle chamber above a predetermined threshold that is needed to inject a commanded amount of gaseous fuel within a predetermined injection pulse width for each engine operating condition.

In general, injection accuracy is improved by reducing the range of inlet pressure variation that a fuel injector sees at the time of injection. Injector inlet pressure is not constant due to the creation of pressure waves within the fuel injector (due to the pulsed nature of fuel injection) that get transmitted to the fuel rail. A fuel injector creates a lower pressure wave at the injection valve when opening and a high pressure wave when closing. These pressure waves originate at the injection valve and travel upstream initially. To achieve a reduction in the range of inlet pressure variation an injector sees, it is useful to isolate the fuel injectors from the fuel rail such that the pressure waves generated during the injection events do not get transmitted to the fuel rail and thus to other injectors. There is a limit to this isolation in regard to the size of the orifice (that is, the size of the restricted fluid flow passage). The orifice cannot be too small, since this will reduce the flow through the injectors during the injection event. The location of the orifice relative to the injection valve, and more particularly to the injection valve seal, is also important. The orifice size will have no impact on the flow through the injector during the injection event when the orifice is far enough away from the injection valve seal such that there is no fuel flow through the orifice while the injection valve is opened, that is during the injection event. The orifice can be placed at a distance such that fuel flow is just about to begin therethrough as the injector is closed. Then the only effect from the size of the orifice is if the orifice is too small that it cannot "re-fill" the volume between the orifice and the injection valve seal in between injection events. In an exemplary embodiment restricted fluid flow passage 150 is located a predetermined distance away from the injection valve seal of fuel injector 110 such that there is no flow through passage 150 during injection events. Flow through restricted fluid flow passage 150 begins when the low pressure wave created upon opening the injection valve reaches the passage. The pressure waves between passage 150 and the injection valve travel at the speed of sound, and the predetermined distance can be at least equal to the value calculated according to Equation 1, where D is the predetermined distance (measured in meters), SOS is the speed of sound (measured in meters per second) through the gaseous fuel between the injection valve and passage 150, and PW is the pulse width of the injection event (measured in seconds), also referred to as the opened time herein.

$$D = SOS * PW \qquad \text{Equation 1}$$

The speed of sound through gaseous fuel is directly related to gaseous fuel pressure and increases as the pressure increases. In an exemplary embodiment the predetermined distance is calculated according to Equation 1 when gaseous fuel pressure is equal to the maximum gaseous fuel pressure and the pulse width is equal to the maximum pulse width employed by engine 100, which will thereby effectively remove the effect of the orifice during injection events under this and any other engine operating condition. Typically, the maximum gaseous fuel pressure and the maximum pulse width are employed during maximum engine load conditions.

In another exemplary embodiment, the predetermined distance can be at least equal to the distance calculated according to Equation 2 below. When the low pressure wave (a trough) created during an injection event reaches restricted fluid flow passage 150 it gets reflected as a high pressure wave (a crest) that begins travelling back towards the injection valve. As long as the injection valve is closed before the crest wave reaches the starting position of the low pressure wave front (in the vicinity of the injection valve seal) then the amount of fuel injected will not substantially be affected by the pressure wave within the fuel injector, even though gaseous fuel flow has begun through restricted fluid flow passage 150 due to the low pressure wave creating as the injection valve was opened. Similar to Equation 1, Equation 2 can be calculated using parametric values for the variables determined under maximum engine load conditions.

$$D = \frac{SOS * PW}{2} \qquad \text{Equation 2}$$

Figure 2:
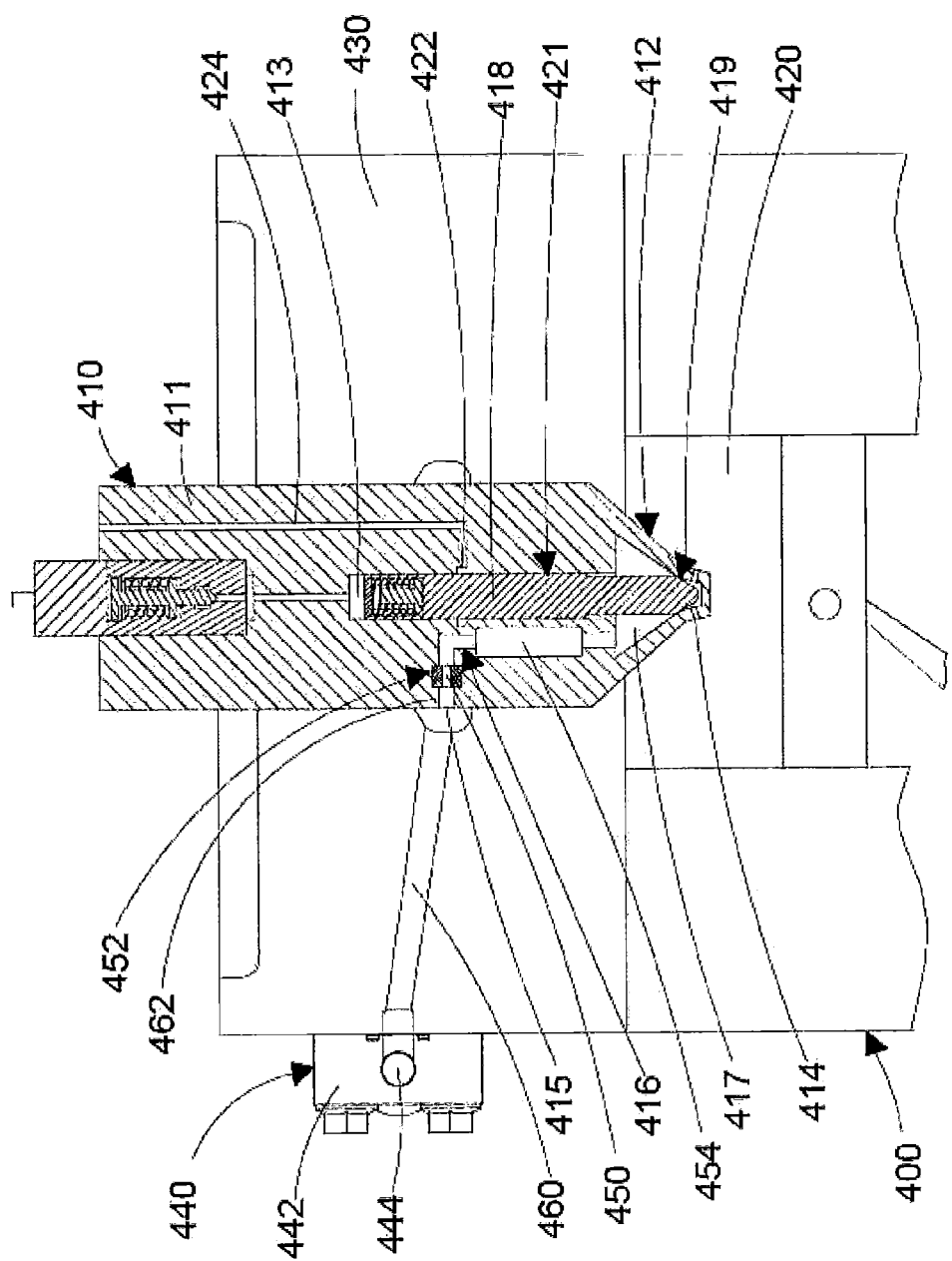
FIG. 2 is a schematic representation of second embodiment of the present fuel supply system for a gaseous fuelled internal combustion engine.

FIG. 2 is a schematic representation of second embodiment of the present fuel supply system for a gaseous fuelled internal combustion engine. This embodiment has many components that are equivalent to like components of the embodiment presented in FIG. 1 and like components are identified by like reference numbers. In this disclosure like-numbered components function in substantially the same way in each embodiment. Accordingly if like components have already been described with respect to the first embodiment illustrated in FIG. 1, the purpose and the function of such components will not be repeated here in connection with FIG. 2.

The difference between the embodiment illustrated in FIG. 2 and the embodiment illustrated in FIG. 1 is that in this second embodiment the restricted fluid flow passage is not integrated within the body of the fuel supply conduit. Instead, a separate body 452 is placed within injector body 411, between gaseous fuel supply conduit 440 and nozzle chamber 417 and body 452 is provided with a restricted fluid flow passage 450. The gaseous fuel flow passage 460 fluidly connecting restricted fluid flow passage 450 to nozzle chamber 417 in this embodiment is a portion of internal fuel passage 416 which is provided with an enlarged portion 454. The volume of gaseous fuel flow passage 460 between the restricted fluid flow passage and the nozzle chamber is calculated to reduce the pressure pulsations within the nozzle chamber 417. The fluid flow area of restricted fluid flow passage 450 is selected as a function of the volume of this gaseous fuel flow passage to maintain pressure pulsations within internal fuel passage 416 and nozzle chamber 417 within a predetermined pressure range while maintaining gaseous fuel pressure within nozzle chamber above a predetermined threshold that is needed to inject a commanded amount of gaseous fuel within a predetermined injection pulse width for each engine operating condition. In some embodiments, body 452 can be integrated in the injector body 411. Restricted fluid flow passage 450 is located the predetermined distance (as defined in the embodiment of FIG. 1) from an injection valve seal that is formed when needle 418 abuts seat 419. In the illustrated embodiment internal fuel flow passage 416 is shown connecting restricted fluid flow passage 450 in a direct path with nozzle chamber 417, in other embodiments passage 416 can comprise multiple sections that form a path that is not direct between the restricted fluid flow passage and the nozzle chamber such that the restricted fluid flow passage is located the predetermined distance away from the injection valve seal. In an exemplary embodiment, there can be multiple side by side fluid passage sections like enlarged portion 454 that are connected in series, such that the path between restricted fluid flow passage 450 and nozzle chamber 417 reciprocates back and forth.

Figure 3:
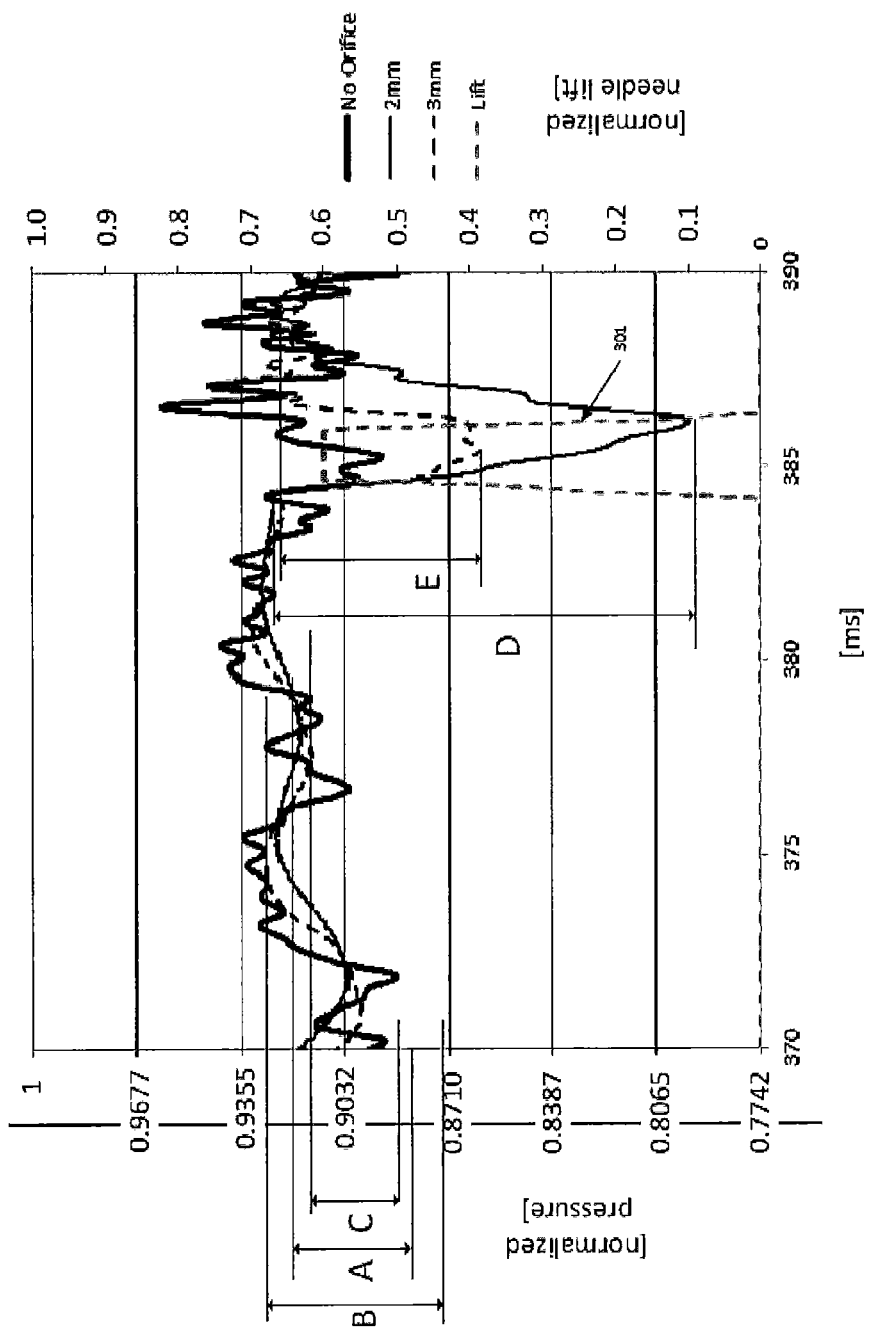
FIG. 3 shows a graph comparing the modelled gaseous fuel pressure variation within the nozzle chamber for a fuel supply system having no restricted fluid flow passage to the modelled gaseous fuel pressure for a fuel supply system having a restricted fluid flow passage of different sizes.

Modelling conducted on different sizes of dampening orifices have shown that pressure pulsations within the nozzle chamber of the injector are reduced by reducing the size and implicitly the flow area of restricted fluid flow passage as illustrated in FIG. 3. The pressure pulsations within the nozzle chamber of the injector before opening and after closing the injector for a fuel system comprising a restricted fluid flow passage having a 3 mm and respectively a 2 mm diameter are reduced compared to the pressure pulsations within the nozzle chamber when there is no restricted fluid flow passage in the fuel supply system. More specifically it was observed that the maximum peak to trough magnitude "A" of fuel pressure pulsations within the nozzle chamber before the start of fuel injection (SOI) for a fuel supply system having a dampening orifice of a 3 mm diameter is smaller than the maximum peak to trough magnitude "B" of fuel pressure pulsations for a fuel supply system that has no dampening orifice and at the same time it is larger than the maximum peak to trough magnitude "C" of the fuel pressure pulsations for a fuel supply system that has a dampening orifice of 2 mm. If the maximum peak to trough magnitude of the pressure pulsations is larger than a predetermined range, the pressure within the nozzle chamber at the start of injection can vary beyond a predetermined acceptable limit and this causes too big a variation in the amount of fuel injected into the combustion chamber. This means that for reducing the variation of the amount of fuel injected into the combustion chamber during an injection event the mean pressure within the nozzle chamber before an injection event is preferably maintained within a predetermined range. Data plotted in FIG. 3 proved that pressure pulsations can affect engine performance if not dampened. The modelling results have shown that the mean pressures within the nozzle chamber for a fuel supply system having a dampening orifice with respective 3 mm and 2 mm diameters, for this particular modelled engine, were within a predetermined acceptable range $P_{acc}$ while the mean pressure for a fuel system having no pressure dampening orifice was outside of the predetermined range. The mean pressure within the present disclosure is interpreted to be the average pressure measured within the nozzle chamber between two injection events. The modelling done on the same engine has also shown that the pressure drop within the nozzle chamber during an injection event varies depending on the size of the restricted fluid flow passage, more specifically that the pressure drop increases for restricted fluid flow passages with a smaller diameter. As illustrated in FIG. 3, the pressure drop "D" during an injection event for a restricted fluid flow passage having a diameter of 2 mm was larger than a pressure drop "E" for a restricted fluid flow passage having a diameter of 3 mm. This alone is not surprising but it demonstrates a trade off in selecting the size of the restricted fluid flow passage to balance between dampening and managing the pressure drop so that the final pressure in the fuel injector nozzle is above the minimum pressure needed to inject the desired amount of fuel within a predetermined injection pulse width for each engine operating conditions.

Therefore based on the modelling results the flow area of the restricted fluid flow passage is preferably selected to reduce the fuel pressure pulsations within the nozzle chamber and to keep the mean fuel pressure and the pressure drop at the injector nozzle during an injection event within predetermined ranges so that a predetermined amount of fuel is introduced into the combustion chamber.

Similarly the volume of the flow passage between the restricted fluid flow passage and the fuel injector inlet and respectively between the restricted fluid flow passage and the nozzle chamber influences the magnitude of the pressure pulsations and the pressure drop at the fuel injector inlet during an injection event. Therefore the volume of the fuel flow passage between the restricted fluid flow passage and the nozzle chamber is also calculated based on the desired range for the maximum peak to trough magnitude and consequently based on the desired range for the mean pressure and for the pressure drop within the nozzle chamber. The fluid flow area of the restricted fluid flow passage is therefore selected as a function of the predetermined volume of fuel flow passage as calculated above to maintain the pressure pulsations within the injector's nozzle chamber within a predetermined pressure range while maintaining gaseous fuel pressure within the nozzle chamber above a predetermined threshold that is needed to inject a commanded amount of gaseous fuel within a predetermined injection event.

Figure 4:
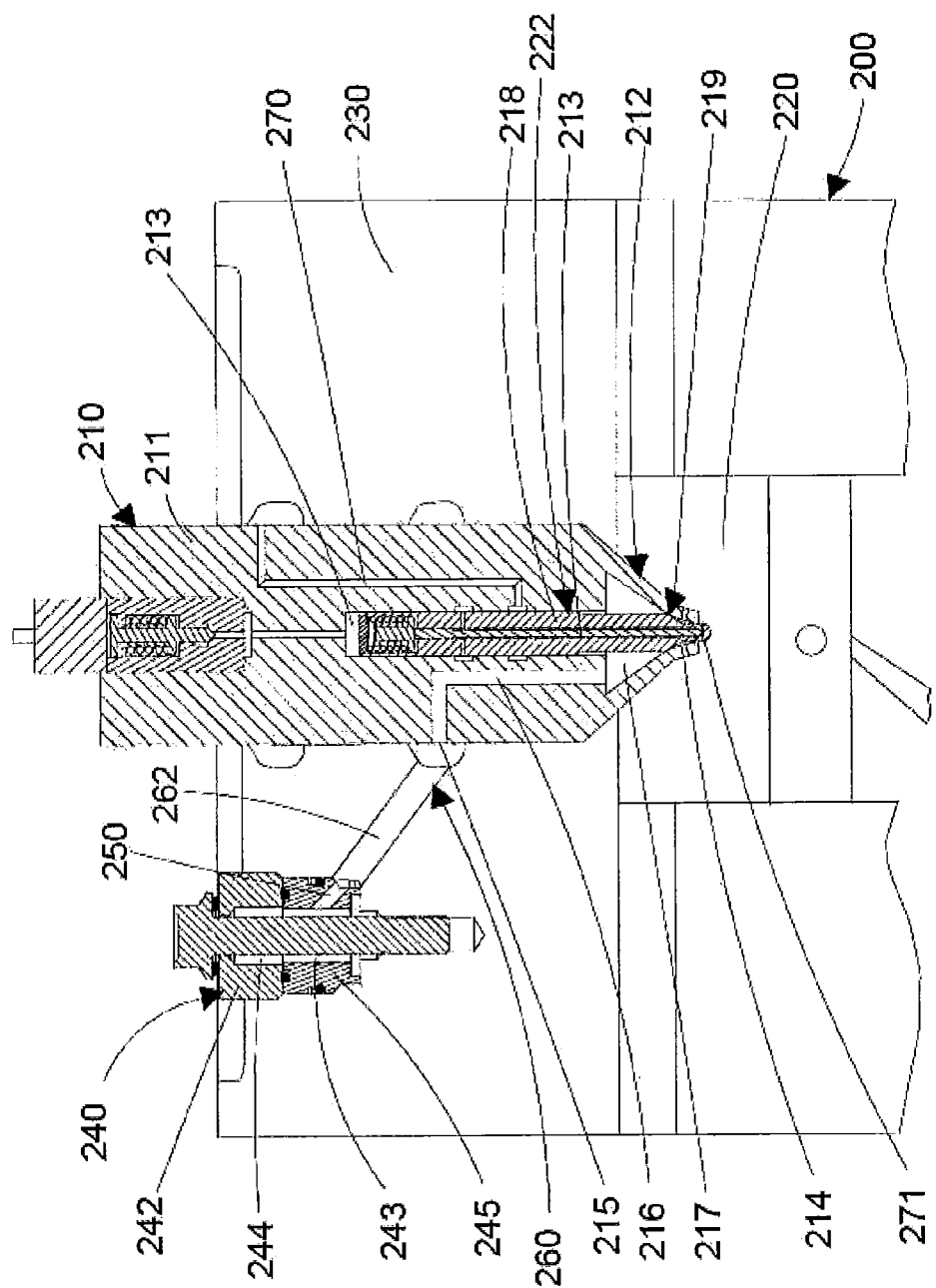
FIG. 4 is a schematic representation of another embodiment of the present fuel supply system for a dual fuel internal combustion engine.

Another embodiment of the present disclosure is illustrated in FIG. 4 which shows a gaseous fuel supply system for a dual fuel internal combustion engine fuelled with a liquid fuel and a gaseous fuel having an internal gaseous fuel rail which is mounted within the cylinder head. The gaseous fuel supply system comprises fuel injector 210 for injecting the gaseous fuel and the liquid fuel into combustion chamber 220 of engine cylinder 200.

Fuel injector 210 has a body 211 which comprises a nozzle 212 provided with a plurality of injection holes 214 through which gaseous fuel is injected from gaseous fuel plenum 217 into the combustion chamber 220. The injector comprises an outer needle 218 which can be lifted from its seat 219 by an actuator to allow gaseous fuel injection through injection holes 214 into combustion chamber 220. The injector also comprises an inner needle 213 which is seated inside the outer needle 218 and can be lifted from its seat by an actuating mechanism to allow the injection of the liquid fuel supplied through liquid fuel passage 270 from a liquid fuel rail (not illustrated) into the combustion chamber through injection holes 271 provided in outer needle 218. Needle 218 can be actuated by a hydraulic actuator, more specifically needle 218 moves within needle bore 221 inside body 211 of the fuel injector being actuated by the hydraulic fluid pressure in hydraulic control chamber 213 of the hydraulic actuator which is controlled by the engine controller. To avoid any gaseous fuel leakage from nozzle chamber 217 to hydraulic control chamber 213 fluid seals 222 are provided between the needle and the needle bore in the body of the injector. Sealing fluid is supplied to the seals through a sealing fluid passage (not illustrated). Furthermore, to prevent any further leakage, needle 218 is match fit with needle bore 221 between hydraulic control chamber 213 and nozzle chamber 217.

Gaseous fuel is supplied to nozzle chamber 217 from the gaseous fuel supply conduit 240 which is at least partially mounted in cylinder head 230. Gaseous fuel supply conduit 240 comprises a body 242 and a fuel supply passage 244 from which gaseous fuel is supplied through supply channel 243 provided in a separate component 245, and through restricted fluid flow passage 250 and gaseous fluid flow passage 260 to nozzle chamber 217. Gaseous fuel flow passage 260 comprises first fuel flow passage 260 which is located within the cylinder head and internal fuel passage 216. As illustrated in FIG. 4, restricted fluid flow passage 250 is not placed in the gaseous fuel supply conduit, but in a component that is separate from it. This might have manufacturability advantages over the embodiment presented in FIG. 1 because a separate component can be more easily customized to the required dimensions of the dampening orifice. Gaseous fuel is supplied from injector inlet 215 to nozzle chamber 217 through internal fuel passage 216.

As in the previous embodiment, the volume of first fuel flow passage 262 and implicitly the volume of the gaseous fuel flow passage 260 are calculated to reduce the gaseous fuel pressure pulsations within the nozzle chamber before the start of fuel injection such that the maximum peak to trough magnitude of the fuel pressure pulsations and the pressure drop within the nozzle chamber is maintained within a predetermined range. In some embodiments, the volume of first fuel flow passage 262 may be restricted by the space available in the cylinder head. As in the previous embodiments, the fluid flow area of the restricted fluid flow passage 250 is selected as a function of the volume of gaseous fuel flow passage 260 to maintain the gaseous fuel pressure within the nozzle chamber above a predetermined threshold that is needed to inject a commanded amount of gaseous fuel within an injection event and may be further selected to preferably maintain a mean gaseous fuel pressure and the gaseous fuel pressure drop within the nozzle chamber within predetermined ranges. Restricted fluid flow passage 250 is located the predetermined distance from an injection valve seal, which is formed when needle 218 abuts seat 219.

In an injector which injects both the gaseous fuel and the liquid fuel into the combustion chamber, as the one illustrated in FIG. 4, there are additional requirements regarding the pressure of the gaseous fuel and respectively the pressure of the liquid fuel being injected into the combustion chamber. A certain bias has to be maintained between the gaseous fuel pressure and the liquid fuel pressure to reduce or preferably avoid any gaseous fuel leakage into the liquid fuel. If the pressure of the gaseous fuel within nozzle chamber 217 is not dampened and raises to a pressure higher than the liquid fuel, gaseous fuel can leak into the liquid fuel by travelling between the match fits between needle 218 and bore 221 and can leak into the needle control chamber 213 through fluid seals 222 that normally fluidly isolate the gaseous fuel from the hydraulic fluid. In many cases the hydraulic fluid used for actuating the needle is the liquid fuel used for igniting the gaseous fuel. Therefore the gaseous fuel pressure is normally maintained lower than the pressure of the liquid fuel to reduce and preferably prevent such leakage.

Figure 5:
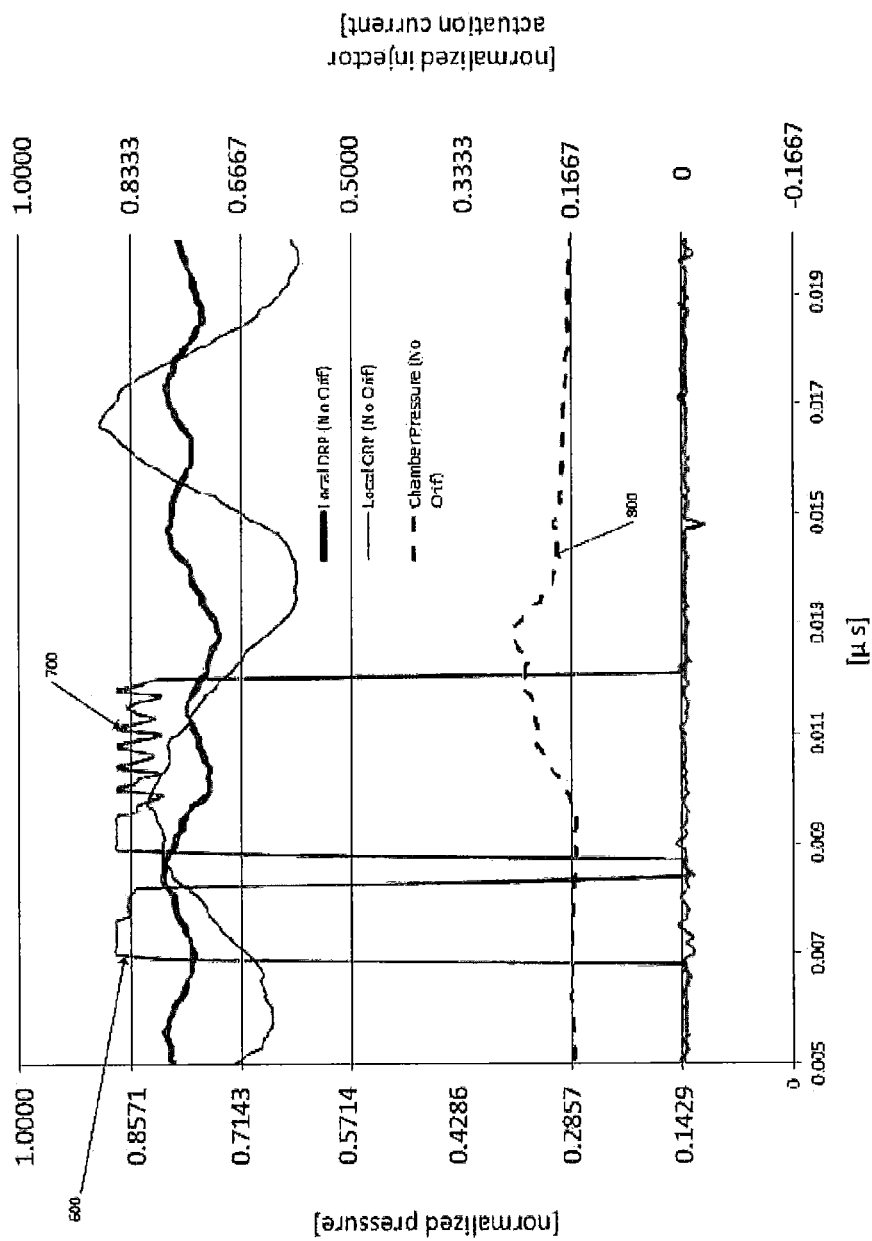
FIG. 5 shows a graph illustrating modelling results for the gaseous fuel pressure variation within the nozzle chamber compared with the diesel fuel supply pressure for a fuel supply system of a dual fuel internal combustion engine having no restricted fluid flow passage.
Figure 6:
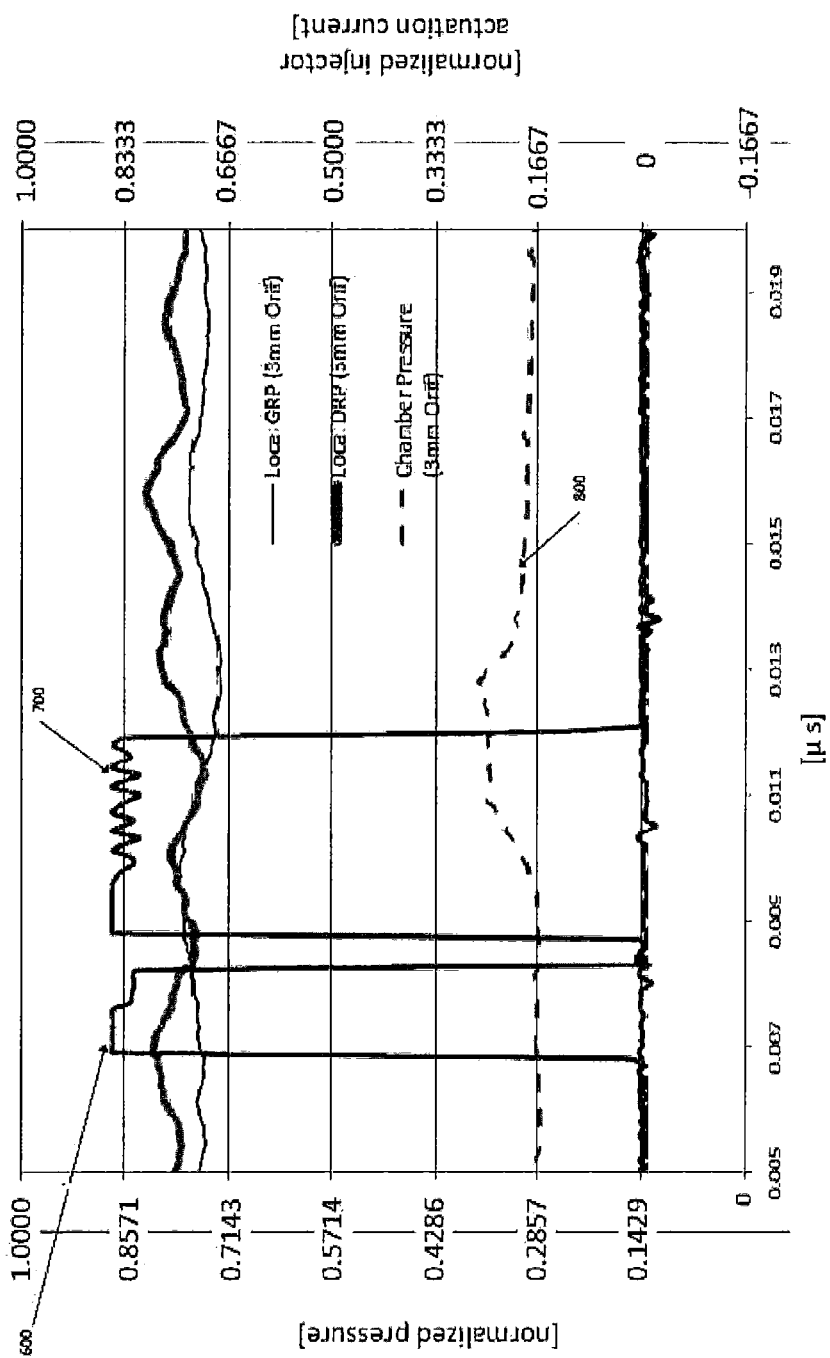
FIG. 6 shows a graph illustrating modelling results for the gaseous fuel pressure variation within the nozzle chamber compared with the diesel fuel supply pressure for a fuel supply system having a restricted fluid flow passage similar to the one illustrated in FIG. 4.

FIGS. 5 and 6 show the modelling results for the gaseous fuel pressure within the nozzle chamber ("local GRP") and for the liquid fuel supply pressure within the injector ("local DRP") for a fuel supply system without a restricted fluid flow passage ("No Orif") and respectively for a fuel supply system with a restricted fluid flow passage having a 3 mm diameter. The modelling shows that for the fuel supply system that does not comprise a restricted fluid flow passage, the gaseous fuel pressure (local GRP) during an injection event which comprises a liquid fuel injection 600 and a gaseous fuel injection 700 becomes higher than the liquid fuel pressure (local DRP) for a prolonged period of time, as illustrated in FIG. 5. The plotted data shows that a gaseous fuel supply system that comprises a restricted fluid flow passage the gaseous fuel pressure (local GRP) within the nozzle chamber stays lower than the liquid fuel supply pressure for almost the entire injection event, the occasional spikes of gaseous fuel pressure being of a very short duration which reduces the risk of gaseous fuel leakage into liquid fuel. The modelling results illustrated in FIGS. 5 and 6 have been obtained for an existing conventional internal combustion engine and for this particular engine, the size of the restricted fluid flow passage was calculated such that the pressure of the gaseous fuel within the nozzle chamber was maintained lower than the liquid fuel pressure by a predetermined value (bias) during the entire engine operation. Another aspect that was considered during the calculations of the fluid flow area of the restricted fluid flow passage was that the shape of the trace of the pressure within the nozzle chamber was preferably maintained the same as the trace of the pressure within the nozzle chamber for a fuel supply system that does not have a restricted fluid flow passage such that substantially the same amount of fuel is injected into the combustion chamber during an injection event and substantially the same injection timing is preserved.

In dual fuel engine systems, the size of dampening orifice 250 and the volume of flow passage 260 are calculated based on the requirements related to providing a predetermined amount of gaseous fuel into the combustion chamber and taking in consideration that the peak pressure of the gaseous fuel within the nozzle chamber has to be maintained lower than the liquid fuel supply pressure by a predetermined bias.

Figure 7:
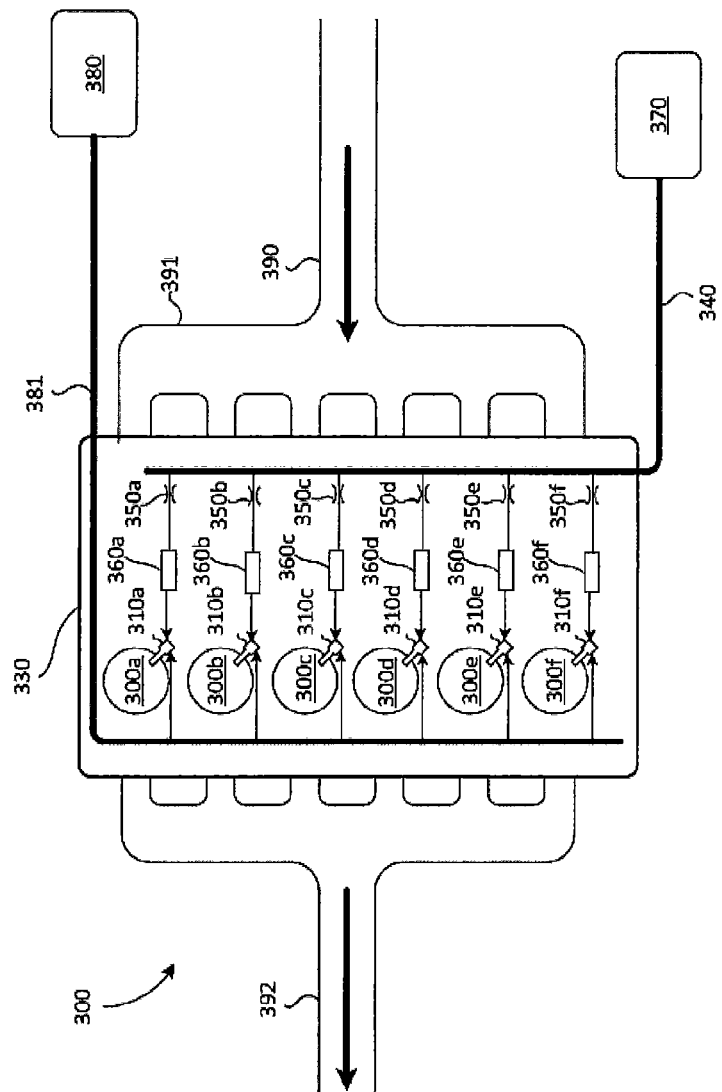
FIG. 7 is a schematic representation of a dual fuelled internal combustion engine with six cylinders comprising another embodiment of the present fuel supply system.

Another embodiment of the present gaseous fuel injection system is schematically illustrated in FIG. 7 which represents a dual fuel direct injection internal combustion system 300. Gaseous fuel is supplied from gaseous fuel storage vessel 370 through gaseous fuel rail 340 to the six engine injectors 310a-310f which each inject the gaseous fuel directly into a respective combustion chamber of an engine cylinder, the six engine cylinders being illustrated with reference numbers 300a to 300f. Liquid fuel is supplied from liquid fuel storage tank 380 through liquid fuel rail 381 to injectors 310a to 310f which each also inject the liquid fuel directly into the combustion chamber of respective ones of the six engine cylinders 300a to 300f. Injectors 310a to 310f can have a similar construction to the dual fuel injector illustrated in FIG. 3 and are located at least partially in the cylinder head 330. Air is supplied through intake port 390 to intake manifold 391 and exhaust gases are directed out of the combustion chambers through exhaust manifold 392.

Gaseous fuel is supplied from rail 340 to each of the injectors 300a to 310f through restricted fluid flow passages 350a to 350f, each restricted fluid flow passage being fluidly connected to the gaseous fuel rail and is also connected to an injector (one of injectors 300a to 300f) through a flow passage of a predetermined volume (one of flow passages 360a to 360f).

In a preferred embodiment, each of the restricted fluid flow passages 350a to 350f has a different size which is calculated based on the pressure pulsations within the nozzle chamber for each one of the six injectors.

In some embodiments the volume of each of the flow passages that fluidly connect each restricted fluid flow passage to each of the fuel injectors is different and it is based on the pressure pulsations within the nozzle chamber of the respective injector to which it is connected.

Modelling results have also shown that the mean gaseous fuel pressure and the pressure drop within the nozzle chamber for each one of the engine injectors can vary from one injector to another according to the size of the restricted fluid flow passage. Therefore the size of the restricted fluid flow passage for each injector is preferably selected to maintain the pressure pulsations within the nozzle chamber of each injector within predetermined ranges.

In the illustrated embodiments herein the gaseous fuel passage connections at injector inlets (115, 415, 215) are shown as gallery connections where an annular volume extends around respective fuel injectors (110, 410, 210) and where the annular volume is fluidly connected with respective gaseous fuel passages (160, 460, 260). In alternative embodiments direct metal-to-metal fuel connections can be employed between respective gaseous fuel passages (160, 460, 260) and injectors inlets (115, 415, 215), such as disclosed in Canadian patent publication 2,875,512, published on Feb. 27, 2015, and co-owned by the Applicant.

For all embodiments described here, the fluid flow area of flow passage which fluidly connects gaseous fuel supply conduit to the injector inlet and the cross-sectional area of fuel passage which connects the injector inlet to the nozzle chamber are each larger than a cross-sectional area of restricted fluid flow passage. This allows a smooth fuel flow between from the restricted fluid flow passage and the injection holes.

In all the described embodiments, the system can be a fuel supply system of a gaseous fuelled internal combustion engine which can be the prime mover for a vehicle. The gaseous fuel can be natural gas that can be stored in a pressurized container, commonly known as compressed natural gas, or in liquefied form in a cryogenic storage vessel, such as an LNG tank.

The present invention has been described with regard to a plurality of illustrative embodiments. However, it will be apparent to persons skilled in the art that a number of variations and modifications can be made without departing from the scope of the invention as defined in the claims.

We claim:

1. A body defining a restricted fluid flow passage in a fuel supply system for delivering a gaseous fuel to an internal combustion engine, said body formed for installation between and fluidly connecting a gaseous fuel supply conduit and a gaseous fuel flow passage that defines a predetermined volume between said restricted fluid flow passage and a nozzle chamber of a fuel injector from which said gaseous fuel is injected into said internal combustion engine, said restricted fluid flow passage having the smallest effective flow area between said gaseous fuel supply conduit and said nozzle chamber, wherein said restricted fluid flow passage is located a predetermined distance from an injection valve seal within the fuel injector, said predetermined distance calculated as a function of a speed of sound in the gaseous fuel and an opened time of the fuel injector, wherein the speed of sound is determined as a function of a maximum gaseous fuel pressure employed by said fuel supply system and said opened time is the maximum opened time of said fuel injector employed for said gaseous fueled internal combustion engine.

2. The body of claim 1, wherein said predetermined distance is at least equal to the distance defined by the multiplication product of the speed of sound in the gaseous fuel and said opened time of said fuel injector.

3. The body of claim 1, wherein said predetermined distance is at least equal to half the distance defined by the multiplication product of the speed of sound in the gaseous fuel and said opened time of said fuel injector.

4. The body of claim 1, wherein a fluid flow area of said restricted fluid flow passage is selected as a function of said predetermined volume to maintain pressure pulsations within said gaseous fuel flow passage within a predetermined pressure range while maintaining gaseous fuel pressure within said nozzle chamber above a predetermined threshold that is needed to inject a commanded amount of gaseous fuel within a predetermined injection pulse width for each engine operating condition.

5. The body of claim 1, being configured in at least one of the following ways:
   wherein said fluid flow area of said restricted fluid flow passage is further selected to maintain a mean fuel pressure in said gaseous fuel flow passage within a predetermined pressure range;
   wherein said fluid flow area of said restricted fluid flow passage is further selected to keep the pressure drop in said gaseous fuel flow passage during an injection event within a second predetermined pressure range; and
   wherein said predetermined threshold is based on a pressure in said gaseous fuel supply conduit.

6. The body of claim 1, wherein said gaseous fueled internal combustion engine is a dual fuel engine which is fueled with said gaseous fuel and a liquid fuel whereby a fuel injector supplies both said gaseous fuel and said liquid fuel to a combustion chamber and wherein said fluid flow area of said restricted fluid flow passage is further selected to maintain a peak pressure in said gaseous fuel flow passage below a liquid fuel supply pressure.

7. A fuel supply system for a gaseous fueled internal combustion engine comprising:
- a gaseous fuel supply conduit;
- a fuel injector for injecting gaseous fuel into said internal combustion engine, said fuel injector having a first body comprising an inlet, and a nozzle chamber fluidly connected to said inlet and from which said gaseous fuel is injected into said internal combustion engine, and comprising a needle and a seat, an injection valve seal formed when said needle abuts said seat;
- second body formed for installation between and fluidly connecting said gaseous fuel supply conduit and a gaseous fuel flow passage of a predetermined volume through which said gaseous fuel supply conduit is connected to said nozzle chamber, said second body defining a restricted fluid flow passage for delivering said gaseous fuel to said nozzle chamber; and
- wherein said restricted fluid flow passage has a smallest effective area between said gaseous fuel supply conduit and said nozzle chamber and wherein a fluid flow area of said restricted fluid flow passage is selected as a function of said predetermined volume to maintain pressure pulsations within said gaseous fuel flow passage within a predetermined pressure range while maintaining gaseous fuel pressure within said nozzle chamber above a predetermined threshold which is needed to inject a commanded amount of gaseous fuel within a predetermined injection pulse width for each engine operating condition.

8. The fuel supply system of claim 7, wherein said restricted fluid flow passage is located a predetermined distance from said injection valve seal, said predetermined distance calculated as a function of a speed of sound in the gaseous fuel and an opened time of the fuel injector, and the speed of sound is determined as a function of a maximum gaseous fuel pressure employed by said fuel supply system and said opened time is the maximum opened time of said fuel injector employed for said gaseous fueled internal combustion engine.

9. The fuel supply system of claim 7, wherein the predetermined distance is at least equal to the distance defined by the multiplication product of a speed of sound in the gaseous fuel and an opened time of the fuel injector.

10. The fuel supply system of claim 7, wherein the predetermined distance is at least equal to half the distance defined by the multiplication product of a speed of sound in the gaseous fuel and an opened time of the fuel injector.

11. The fuel supply system of claim 7, being configured in at least one of the following ways:
- wherein said fluid flow area of said restricted fluid flow passage is further selected to maintain a mean fuel pressure within said nozzle chamber within a second predetermined pressure range; and
- wherein said fluid flow area of said restricted fluid flow passage is further selected to keep the pressure drop within said nozzle chamber during an injection event within a third predetermined pressure range.

12. The fuel supply system of claim 7, being configured in at least one of the following ways:
- wherein said second body defining said restricted fluid flow passage is integrated with said first body of said fuel injector; and
- wherein said second body defining said restricted fluid flow passage is integrated with a third body of said gaseous fuel supply conduit.

13. The fuel supply system of claim 7, wherein said fuel injector injects said gaseous fuel directly in a combustion chamber.

14. The fuel supply system of claim 7, wherein said gaseous fuel is natural gas.

15. The fuel supply system of claim 7, wherein said gaseous fueled internal combustion engine is a dual fuel engine which is fueled with said gaseous fuel and a liquid fuel, said fuel injector supplying both said gaseous fuel and said liquid fuel to a combustion chamber and wherein said fluid flow area of said restricted fluid flow passage is further selected to maintain a peak pressure within said nozzle chamber lower than a liquid fuel supply pressure.

16. The fuel supply system of claim 15, wherein said fuel injector and said gaseous fuel flow passage are at least partially positioned in a cylinder head of said internal combustion engine.

17. The fuel supply system of claim 7, wherein said gaseous fueled internal combustion engine comprises a plurality of engine cylinders, a plurality of said fuel injectors, each of said fuel injector injecting said gaseous fuel into a respective engine cylinder, a plurality of said gaseous fuel flow passages fluidly connecting a nozzle chamber of each of said fuel injectors to said gaseous fuel supply conduit and a plurality of said bodies installed between and fluidly connecting said gaseous fuel supply conduit and a respective gaseous fuel flow passage.

18. The fuel supply system of claim 17, wherein a flow area of one restricted fluid flow passage defined in one of said bodies is different than a flow area of another restricted fluid flow passage defined in another one of said bodies.

19. A method of limiting pressure pulsations within a fuel supply system of a gaseous fueled internal combustion engine comprising a fuel injector, said fuel injector having an injection valve, said injection valve having an injection valve seal, the method comprising:
- locating a restricted fluid flow passage between a gaseous fuel supply conduit and the injection valve seal;
- determining a speed of sound in the gaseous fuel as a function of a maximum gaseous fuel pressure of said fuel supply system; and
- determining an opened time as a maximum opened time of said fuel injector employed for said gaseous fueled internal combustion engine
- wherein said restricted fluid flow passage has the smallest effective area between said gaseous fuel supply conduit and said injection valve seal;
- wherein said restricted fluid flow passage is located a predetermined distance from the injection valve seal, said predetermined distance calculated as a function of the speed of sound in the gaseous fuel and the opened time of the fuel injector.

20. The method of claim 19, further comprising:
- actuating said fuel injector between a closed position and an open position thereby opening said injection valve whereby a pressure wave is generated that travels towards said restricted fluid flow passage as gaseous fuel flows through said injection valve; and
- actuating said fuel injector between said open position and said closed position wherein said injection valve is closed when or before said pressure wave reaches said restricted fluid flow passage.

21. The method of claim 19, further comprising:
- actuating said fuel injector between a closed position and an open position thereby opening said injection valve whereby a pressure wave is generated that travels towards said restricted fluid flow passage as gaseous fuel flows out of said fuel injector; and actuating said fuel injector between said open position and said closed position wherein said injection valve is closed before or when said pressure wave substantially returns to its origin after being reflected by said restricted fluid flow passage.

22. The method of claim 19, further comprising calculating the predetermined distance as at least equal to the distance defined by the multiplication product of the speed of sound in the gaseous fuel and said opened time of said fuel injector.

23. The method of claim 19, further comprising calculating the predetermined distance as at least equal to half the distance defined by the multiplication product of the speed of sound in the gaseous fuel and said opened time of said fuel injector.

24. A fuel supply system for a gaseous fueled internal combustion engine comprising:

a gaseous fuel supply conduit;

a fuel injector for injecting gaseous fuel into said internal combustion engine, said fuel injector having a first body comprising an inlet, and a nozzle chamber fluidly connected to said inlet and from which said gaseous fuel is injected into said internal combustion engine, and comprising a needle and a seat, an injection valve seal formed when said needle abuts said seat;

a second body formed for installation between and fluidly connecting said gaseous fuel supply conduit and a gaseous fuel flow passage of a predetermined volume through which said gaseous fuel supply conduit is connected to said nozzle chamber, said second body defining a restricted fluid flow passage for delivering said gaseous fuel to said nozzle chamber; and wherein said restricted fluid flow passage is located a predetermined distance from said injection valve seal, said predetermined distance calculated as a function of a speed of sound in the gaseous fuel and an opened time of the fuel injector;

wherein the speed of sound is determined as a function of a maximum gaseous fuel pressure employed by said fuel supply system and said opened time is the maximum opened time of said fuel injector employed for said gaseous fueled internal combustion engine.

25. A fuel supply system for a gaseous fueled internal combustion engine comprising:

a gaseous fuel supply conduit;

a fuel injector for injecting gaseous fuel into said internal combustion engine, said fuel injector having a first body comprising an inlet, and a nozzle chamber fluidly connected to said inlet and from which said gaseous fuel is injected into said internal combustion engine, and comprising a needle and a seat, an injection valve seal formed when said needle abuts said seat;

a second body formed for installation between and fluidly connecting said gaseous fuel supply conduit and a gaseous fuel flow passage of a predetermined volume through which said gaseous fuel supply conduit is connected to said nozzle chamber, said second body defining a restricted fluid flow passage for delivering said gaseous fuel to said nozzle chamber; and wherein said gaseous fueled internal combustion engine is a dual fuel engine which is fueled with said gaseous fuel and a liquid fuel, said fuel injector supplying both said gaseous fuel and said liquid fuel to a combustion chamber and wherein said fluid flow area of said restricted fluid flow passage is further selected to maintain a peak pressure within said nozzle chamber lower than a liquid fuel supply pressure.

* * * * *